Nov. 15, 1960  R. B. WATROUS  2,960,098
FLUID-PRESSURE-OPERATED COMPUTER
Filed June 29, 1959  2 Sheets-Sheet 1

INVENTOR.
ROBERT B. WATROUS
BY Arthur H. Swanson
ATTORNEY.

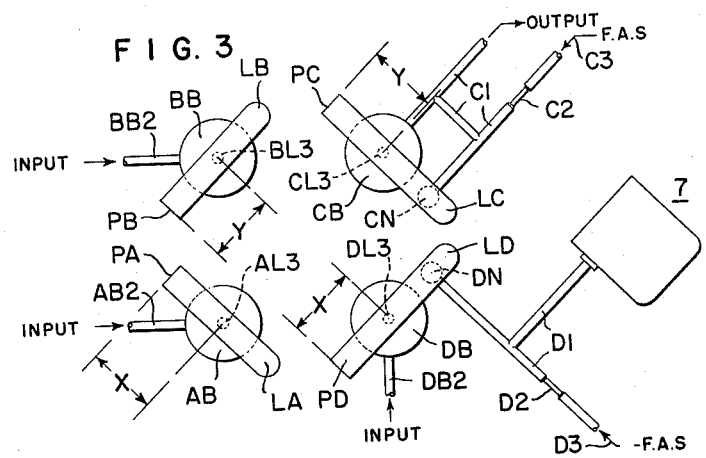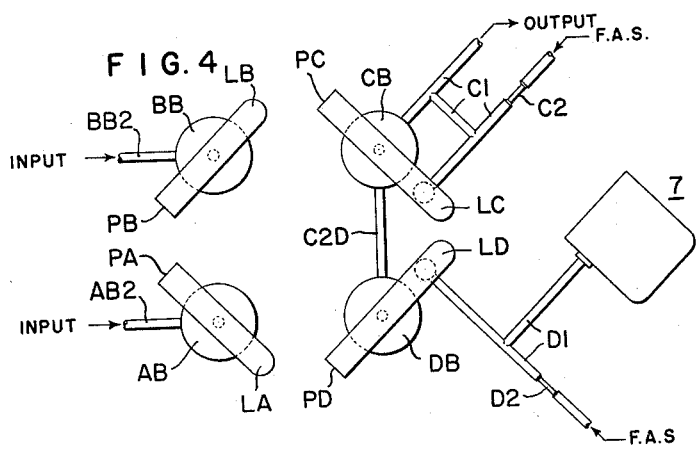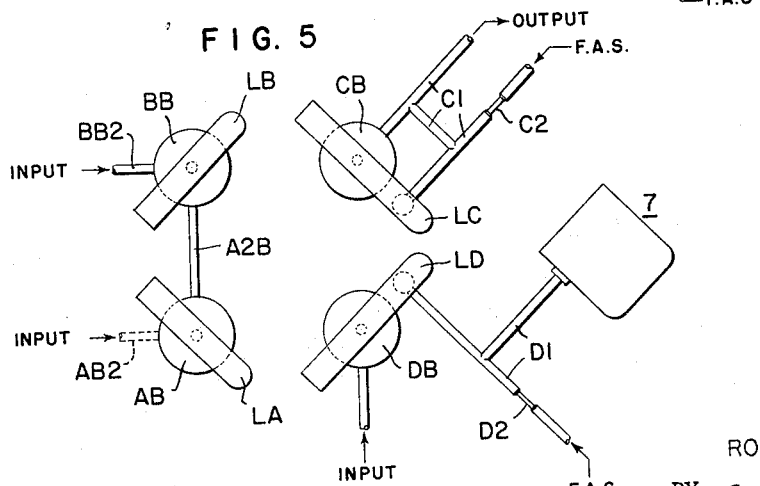

United States Patent Office 2,960,098
Patented Nov. 15, 1960

2,960,098

FLUID-PRESSURE-OPERATED COMPUTER

Robert B. Watrous, Philadelphia, Pa., assignor to Minneapolis-Honeywell Regulator Company, Minneapolis, Minn., a corporation of Delaware Filed June 29, 1959, Ser. No. 823,542

6 Claims. (Cl. 137—85)

This invention relates to a mechanism, herein referred to as a relay, in which the output varies as a mathematical function of the input. The output may vary as a fixed function of the input or the output may vary as a variable function of the input.

More specifically, the device of this invention has one or more inputs which may be in the form of a fluid pressure and an output in the form of a fluid pressure which varies as a mathematical function of the input either in a fixed ratio or a changing ratio.

The word "fluid" is used herein in its broadest significance and includes both an incompressible liquid, such as water, and an elastic gas, such as air.

More specifically, the device of this invention includes means whereby the ratio of the input to the output may be set manually and remain at that ratio or the ratio may be adjusted as part of the action of the mechanism to vary as a certain function of the input. By these means, the mechanism of this invention operates as a computer and can perform the mathematical functions of multiplication, division, raising a number to a power thereof or extraction of roots of a number.

A better understanding of the present invention may be had from the following detailed description when read in connection with the accompanying drawings in which:

Figs. 3, 4 and 5 are schematic diagrams showing various modified configurations which the device may take.

Figure 1:
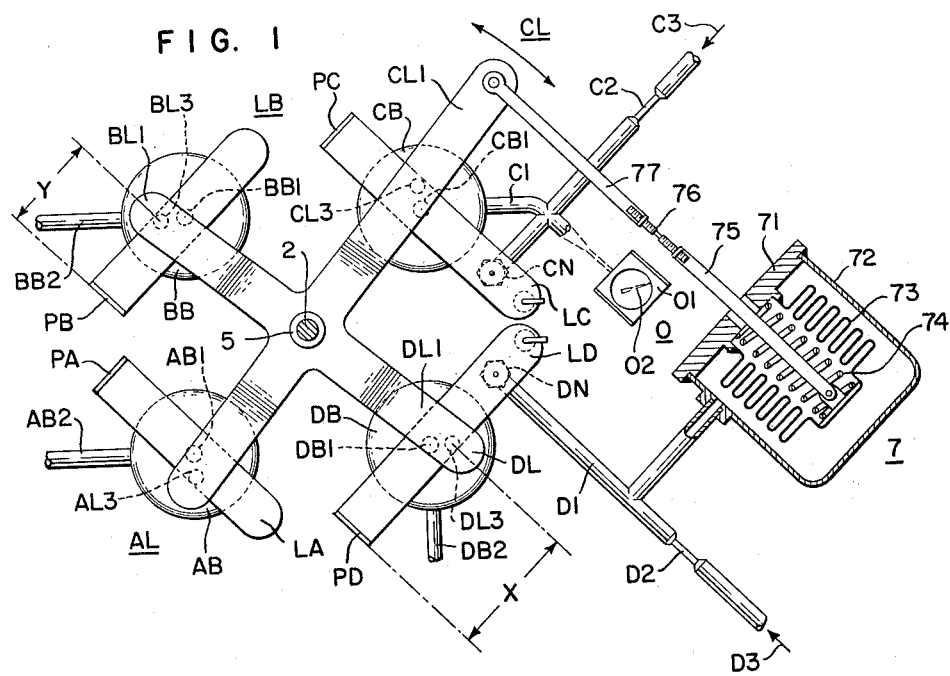
Fig. 1 is a diagrammatic top or plan view with parts in horizontal cross section.

The mechanism or relay of this invention comprises a rigid base 1 from an upper portion of which depends a central pivot post 2 having its lower end 3 pointed. A cross-shaped spider 4 has a central pivot cylinder 5 having an opening 6 therein of somewhat larger conical shape than the pointed end 3 of the central pivot post 2 so that the opening 6 receives the pointed end 3 in it. The spider 4 is thus provided with a central pivot about which it can rock.

The spider 4 has four arms, AL, BL, CL and DL.

Figure 2:
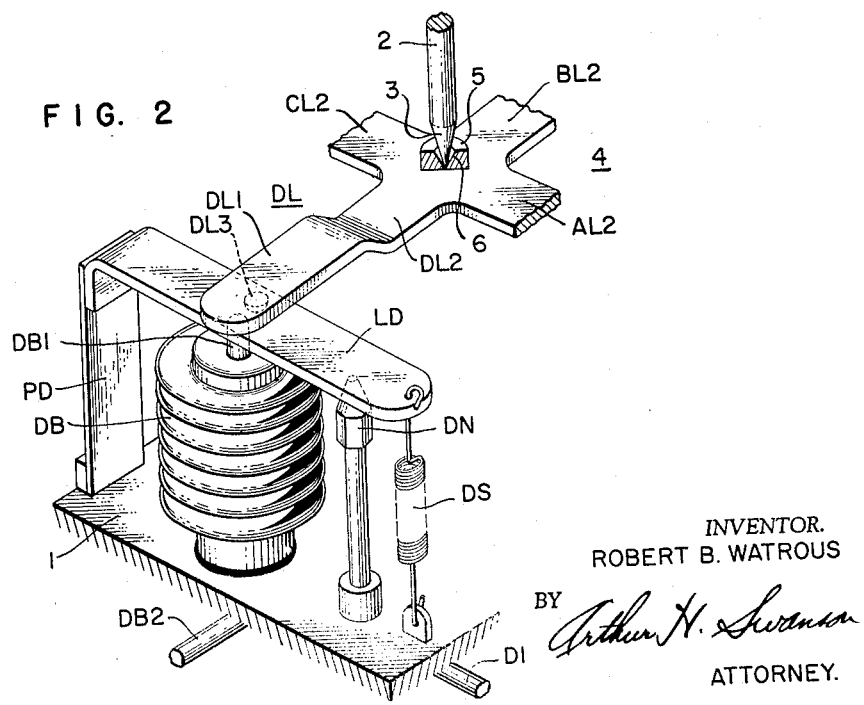
Fig. 2 is a partial view in perspective with parts broken away.

Referring to Fig. 2, it will be seen that each of the arms of the spider 4 cooperates with an input element about to be described. Instead of the air-pressure-operated input element about to be described, a mechanical input element such as a spring or an electric element, such as a solenoid, may be employed. Since there are four of these input elements, only one will be described.

These input elements have the same reference characters applied to each part distinguished by a change in the letter A, B, C or D. Spider 4 has an arm DL which has an upper, outer portion DL1 and a depressed, lower, inner portion DL2.

On the under surface of the outer portion DL1 is a depending button contact DL3. The point of engagement between the central pivot post 2 and the bottom of the opening 6 in the spider 4 is in the same plane as the point of engagement of the contacts AL3, BL3, CL3 and DL3 with the levers LA, LB, LC and LD, respectively.

On base 1 is mounted a pivot PD comprised of a flat, flexible strip secured at its lower end to the base 1 and at its upper end to a flange forming one end of lever LD. Base 1 also supports a flexible bellows DB having at its upper, free end a contact button DB1 which engages the under side of the lever LD. An input pipe DB2 conducts fluid to the interior of the flexible bellows DB.

A suppression spring DS is secured at one end to the end of lever LD opposite to the pivot PD. The opposite, lower end of spring DS is secured to base 1. This suppression spring DS opposes the pressure of the fluid inside the bellows DB. This permits a certain pressure, normally three pounds per square inch, to be employed in the bellows DB when the mechanism is in its initial position. The pressure in bellows DB is varied over a limited range, normally from three to fifteen pounds per square inch. The action of spring DS is referred to as suppression of the zero or initial pressure within the bellows DB.

Referring to Fig. 1, it will be seen that the motion of lever LC is detected by means of a nozzle CN to which air is fed through a pipe C1 and a restriction C2 from a filtered air supply C3.

Pipe C1 also connects with bellows CB and with an output element O having a case O1 and a pointer O2. The output element O may be an indicator, as shown, or a recorder or a controller. Such indicators, records or controllers are well known and need not be described in detail herein.

The motion of lever LD is detected by means of a nozzle DN to which air is fed by means of a tube D1 through a restriction D2 from a source of compressed air, referred to in some places herein as a supply of power or filtered air supply D3. The lever LD and the nozzle DN thus act as a flapper-nozzle valve.

Piper D1 also connects with a motor 7 comprised of a base 71 mounted on base 1 and supporting a rigid case 72 which surrounds a bellows 73 mounted, at one end, to motor base 71 and having its opposite end free. A spring 74 bears, at one end, on base 71 and, at its opposite end, on the free end of bellows 72. A link 75 is pivoted to the free end of bellows 72. A turn buckle 76 connects the opposite end of link 75 to a link 77 which is pivoted at its opposite end, to arm CL of spider 4.

In order to describe the operation of one configuration of this mechanism, reference may be had to Fig. 3. The spider 4 is omitted from Figs. 3, 4 and 5, for the sake of clarity, but it will be readily understood that spider 4 overlies the levers LA, LB, LC and LD and engages therewith by means of four button contacts AL3, BL3, CL3 and DL3. The distance between pivot PA and the point of engagement between lever LA and contact LA3 and the distance between pivot PD and the point of engagement between lever LD and contact DL3 is allowed to equal X. The distance between pivot PB and the point of engagement between the lever LB and contact BL3 and the distance between pivot PC and the point of engagement between lever LC and contact CL3 is permitted to equal Y. The pressure within each of the bellows AB, BB, CB and DB is allowed to equal A, B, C and D, respectively.

When the device is in its initial position, the pressures A, B, C and D within the bellows AB, BB, CB and DB, respectively, are not changing. If the pressure A is changed, either manually or automatically by a measuring instrument, the corresponding bellows AB expands and rocks the corresponding lever LA about its pivot and applies a moment of force to the spider 4. This moment of force causes the spider 4 to rock about the axis constituted by the fulcrums BL3 and DL3. This rocking movement of the spider 4 varies the distance between the lever LC and the nozzle CN. This distance controls the amount of air which escapes through the nozzle CN and, consequently, controls the pressure in pipe C1 applied to the element CB and to the output bellows O. This variation in pressure C applied to the bellows CB causes a moment of force to be applied through the lever LC to the spider 4 in a direction opposite to the movement of force applied to the spider 4 by the bellows AB and the lever LA. Therefore, the spider 4 moves in the opposite direction to that in which it was moved by the change in the pressure A until the moments of force on the spider again rebalance and the spider 4 comes to rest. When the spider 4 comes to rest, the pressure C in the pipe C1 and in the output element O is at a value determined by the following equations:

Let A represent the pressure in the bellows AB, let B represent the pressure in the bellows BB, let C represent the pressure in the bellows CB and D represent the pressure in the bellows DB.

A multiplied by X equals C multiplied by Y.

Therefore, C equals A multiplied by X divided by Y. Therefore, the output pressure C can be made to represent the pressure A multiplied by the ratio X divided by Y. If the ratio X divided by Y is more than one, C is a multiplication function of the input pressure A. If the ratio X divided by Y is less than one, C is a division function of the input pressure A.

In the preceding discussion, no mention was made of changing the pressure B nor the pressure D. Since the pressure D does not change there is no rocking of the spider 4 in its own plane about the vertical pivot formed by the axis of post 2.

Therefore, in the preceding example, the ratio between the input and the output is always fixed. This ratio may be changed manually by shifting the spider 4 about the axis formed by the axis of the pivot post 2 by hand by adjusting the turn buckle 76.

If it is desired to vary the ratio between the input pressures A, B and D and the output pressure C, the input pressures A, B and D are varied and the following mechanism is employed.

A variation in the pressure D applied to the bellows DB causes the lever LD to rock about its pivot PD and vary the distance between lever LD and nozzle DN. The distance between lever LD and nozzle DN varies the pressure in the pipe D1, and consequently, the pressure applied to the motor 7.

This variation in the pressure applied to motor 7 causes motor 7 to rock spider 4 in its own plane about the vertical axis formed by the longitudinal axis of post 2.

This oscillation of the spider 4 varies distances X and Y and, therefore, varies the moment of force applied by each of the bellows to the spider 4. It is to be noted that the forces applied by the bellows AB and DB are varied inversely to the forces applied by the bellows BB and CB. This is due to the fact that rotation of the spider 4 in a clockwise direction reduces the distances X and increases the distances Y. If the spider 4 is rotated counter-clockwise, the distances X are increased while the distances Y are decreased.

When a variable air pressure is fed to the bellows DB and the motor 7 is employed to oscillate the spider 4 about its pivot 2, the output of the mechanism varies in accordance with the variable factor D constituting the variable air pressure fed to the bellows DB.

A multiplied by X equals C multiplied by Y.
B multiplied by Y equals D multiplied by X.
C divided by A equals X divided by Y.
B divided by D equals X divided by Y.
Therefore,
C divided by A equals B divided by D.
Therefore, C equals A multiplied by B divided by D.

Therefore, the output pressure C can be made to represent the product of the pressure A multiplied by the ratio of the pressure B divided by the pressure D or to represent the dividend of the product of the pressure A and the pressure B divided by the pressure D.

In other words, the output pressure C is the multiplication function or the division function of the input pressures A, B and D.

In order to perform the mathematical function of extracting square roots, the configuration shown in Fig. 4 may be employed. In this configuration the input pipe DB to the bellows DB is omitted. Instead, the bellows CB and DB are connected by a pipe C2D so that the pressures within the bellows CB and DB are the same.

Using the same symbols as above, B divided by D equals C divided by A.

C multiplied by D equals A multiplied by B.

Therefore, since C equals D, $C^2$ equals A multiplied by B or $D^2$ equals A multiplied by B.

C equals the square root of A multiplied by B.

D equals the square root of A multiplied by B.

Fig. 5 shows a third configuration which may be employed to produce an output which varies as the square function of the input. In this configuration, either the input pipe AB2 to the bellows AB or the input pipe BB to the bellows BB is omitted. Instead, the bellows AB and BB are connected by a pipe A2B so that the pressure within bellows AB and bellows BB is the same. Making the same assumptions as before, the following equations are true:

D multiplied by X equals B multiplied by Y.
A multiplied by X equals C multiplied by Y.
D divided by B equals A divided by C.
Therefore, D equals A multiplied by B and divided by C.

Since B equals A,

D equals $A^2$ divided by C or D equals $B^2$ divided by C. This is the square function.

Claims

Having now described my invention, what is claimed as new and is desired to be secured by Letters Patent is as follows:

1. A ratio relay, including in combination, stationary means providing a pivot, a rigid spider mounted on said stationary means for limited universal movement relative thereto, a plurality of input elements each bearing on said spider and causing a moment of force on said spider about said pivot, each of said input elements being located diametrically opposite to another, said input elements providing two pairs of fulcrums forming two axes about which said spider oscillates, first means operable in response to movements of said spider to vary a first supply of power, first means applying said first power to one of said input elements and causing a moment of force on said spider opposing the moment of force applied by one of said input elements, said moments of force counterbalancing each other and causing said spider to assume a position which represents a mathematical function of said moments of force, and means operable to oscillate said spider about said stationary means about a third axis separate from and at an angle to said first and second axes and thereby to vary inversely to each other the moment of force applied by two of said input elements to said spider.

2. A ratio relay, including in combination, stationary means providing a pivot, a rigid spider mounted on said stationary means for limited universal movement relative thereto, a plurality of input elements each bearing on said spider and causing a moment of force on said spider about said pivot, each of said input elements being located diametrically opposite to another, said input elements providing two pairs of fulcrums forming two axes about which said spider oscillates, first means operable in response to movements of said spider to vary a first supply of power, first means applying said first power to one of said input elements and causing a moment of force on said spider opposing the moment of force applied by one of said input elements, said moments of force counterbalancing each other and causing said spider to assume a position which represents a mathemetical function of said moments of force, and means operable to oscillate said spider about said stationary means about a third axis separate from and at an angle to said first and second axes and thereby to vary inversely to each other the moment of force applied by two of said input elements to said spider, second means operable in response to movements of said spider to vary a second supply of power, and second means applying said second power to said spider, thereby causing said spider to oscillate about said third axis.

3. In a ratio relay: a central pivot post; a plane, rigid, cruciform, metal spider having four oppositely disposed arms and an opening in one surface larger than said post and receiving said post in it, whereby said spider is oscillatable in its own plane and is universally tiltable with respect to said post, each of said arms having a button contact thereon spaced from the center of said spider; and a plurality of levers each pivoted on an axis parallel to the plane of said spider and each engaging one of said button contacts so that oscillation of said spider in its own plane varies the moment of force which each of said levers applies to said spider inversely to the moment of force applied by another of said levers to said spider.

4. A ratio relay, according to claim 3 in which the point of engagement between said post and said spider lies in substantially the same plane as the point of engagement between each of said button contacts and said spider.

5. A ratio relay, including in combination, a central pivot post, a rigid spider having an opening in one surface larger than said post and receiving said post in it, whereby said spider is oscillated in its own plane and is universally tiltable with respect to said post, said spider having on one surface thereof four diametrically disposed button contacts, a plurality of levers, each pivoted on an axis parallel to the plane of said spider and each engaging one of said button contacts, so that oscillation of said spider in its own plane varies the moment of force which each of said levers applies to said spider inversely to the moment of force supplied by another of said levers to said spider, a plurality of air-pressure-operated bellows each bearing on one of said levers and operable to oscillate said lever about its pivot and to apply a moment of force to said spider, a flapper-nozzle valve operable in response to movements of said spider to vary the pressure of a first supply of air, a conduit applying said first supply of air to one of said bellows and causing said bellows to apply a moment of force on said spider opposing the moment of force applied by another one of said bellows, said moments of force counterbalancing each other and causing said spider to assume a position which represents a mathematical function of said moments of force, and means operable to oscillate said spider in its own plane, and thereby to vary inversely to each other the moment of force applied by two of said levers to said spider.

6. A ratio relay, including in combination, a central pivot post, a rigid spider having an opening in one surface larger than said post and receiving said post in it, whereby said spider is oscillatable in its own plane and is universally tiltable with respect to said post, four button contacts on said spider and each located diametrically opposite to another of said button contacts, a plurality of levers each pivoted on an axis parallel to the plane of said spider and each engaging one of said button contacts, so that oscillation of said spider in its own plane varies the moment of force which each of said levers applies to said spider inversely to the moment of force supplied by another of said levers to said spider, a plurality of air-pressure-operated bellows each engaging one of said levers and operable to rock said lever about its pivot and to apply a moment of force to said spider about said post, a first flapper-nozzle valve operable in response to movements of said spider to vary the pressure of a first supply of air, a first conduit applying said first supply of air to one of said bellows and causing a moment of force on said spider opposing the moment of force applied by another one of said bellows, said moments of force counterbalancing each other and causing said spider to assume a position which represents a mathematical function of said moments of force, a second flapper-nozzle valve operable in response to movement of said spider to vary the pressure of a second supply of air, and a second air-pressure-operated motor responsive to the pressure of said second supply of air and connected to said spider, thereby causing said spider to oscillate in its own plane about said post.

References Cited in the file of this patent

UNITED STATES PATENTS

| | | |
|---|---|---|
| 2,568,361 | Pettigrove | Sept. 18, 1951 |
| 2,632,456 | Breedlove | Mar. 24, 1953 |
| 2,675,818 | Gallo et al. | Apr. 20, 1954 |
| 2,736,199 | Ibbott | Feb. 28, 1956 |
| 2,770,968 | Grey | Nov. 20, 1956 |